United States Patent Office 2,869,063
Patented Jan. 13, 1959

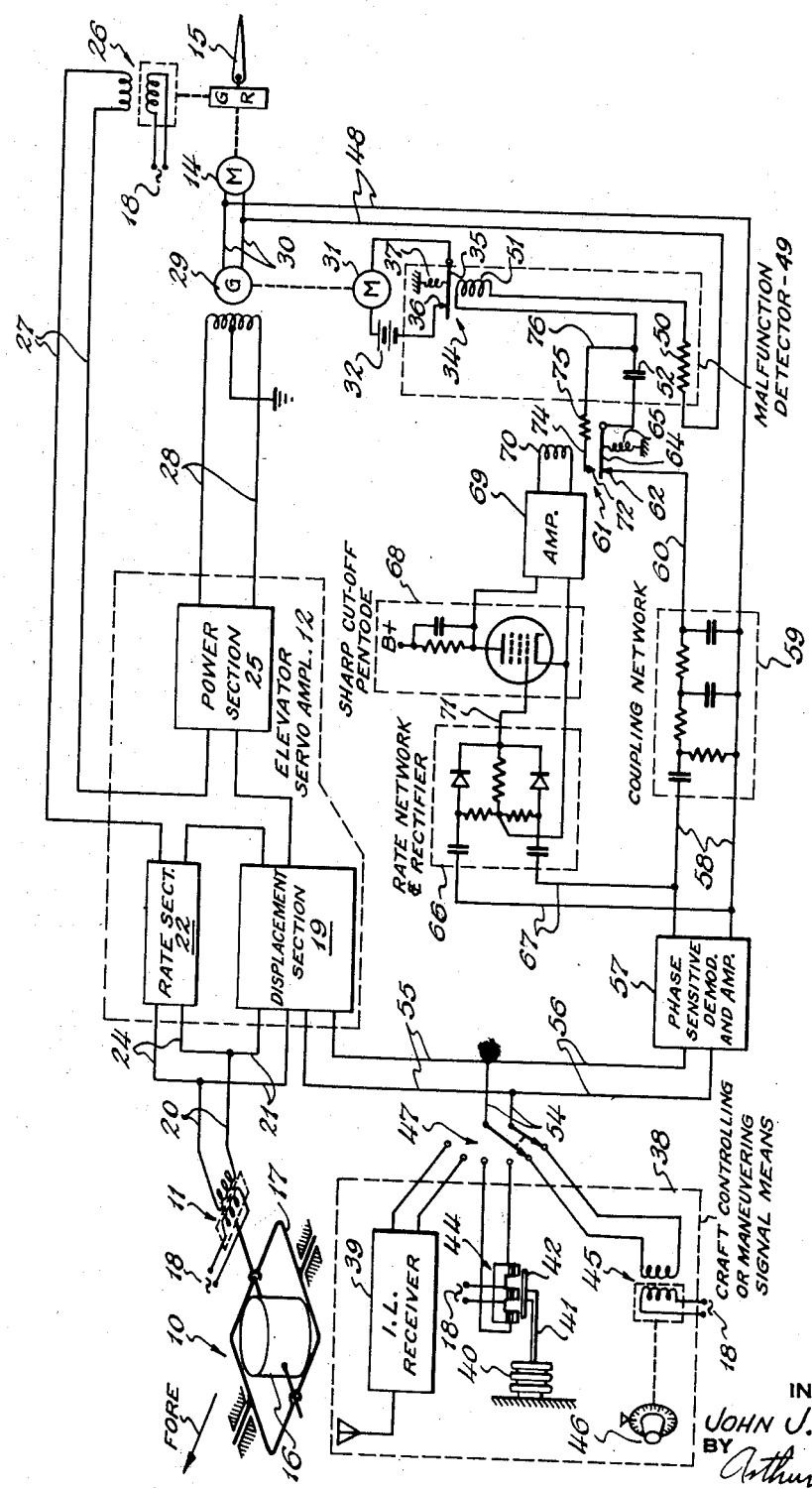

2,869,063

CONTROL SYSTEMS FOR DIRIGIBLE CRAFT

John J. Hess, Jr., Garden City, N. Y., assignor to Sperry Rand Corporation, a corporation of Delaware Application June 10, 1954, Serial No. 435,803

16 Claims. (Cl. 318—489)

This invention relates to an improvement in servomotor control systems for dirigible craft of the character that detects malfunctions and monitors the system in the interest of safety for the craft and cargo and the comfort of its passengers. The improved system is particularly useful in monitoring the functions of an aircraft automatic pilot. Monitoring systems for aircraft automatic pilots of the general character disclosed in U. S. Letters Patent No. 2,487,793, issued November 15, 1949, to Orland E. Esval and Percy Halpert, require the inclusion therein of an element for sensing the actual motion of the craft about its monitored axis such as provided in the patent by a pair of accelerometers. No element of this character or its equivalent is employed in the improved monitoring system. In aircraft piloting systems of the type shown in the noted patent, it was also necessary to disable the monitoring control for the entire duration of any maneuvers of the craft as commanded by the human pilot through operation of the system. The necessity for disabling the monitor during most craft maneuvers has been eliminated in the improved control system or automatic pilot.

The improved system includes a craft controlling or maneuvering means providing an operating signal that effectively modifies the reference established by the system. Such means are herein illustrated in the forms of a manually settable pick-off, an altimeter with an output providing pick-off connected thereto, and a directional radio receiving means such as an instrument landing receiver.

An object of the present invention is to provide a monitoring control system of the character described that is effective during most command maneuvers of the craft in turbulent air to detect the occurrence of malfunctions therein.

One of the features of the invention resides in the provision of a malfunction detecting means for the craft control system or automatic pilot in the form of a band pass filter receiver.

Other objects, features and structural details of the invention will be apparent from the following description when read in connection with the accompanying drawing in which the single view illustrated is a combination schematic view and wiring diagram showing a control system embodying the present inventive concepts.

The control system or automatic pilot illustrated in the drawing normally functions to maintain a dirigible craft such as an aircraft at a predetermined reference attitude about an axis. For the purposes of the present description, the controls shown are effective about the pitch axis of an aircraft as this axis is considered of most importance as far as safety is concerned. For this reason, the system is shown as controlling the craft through its elevator surfaces. It will be understood that the improved monitoring system is equally adaptable for use in detecting malfunctions of the system applicable to the roll and yaw axes of the craft. The basic elements of the system or automatic pilot shown in the drawing include a reference means in the form of a gyro vertical 10 and pick-off 11, an elevator servo amplifier 12, and a servomotor 14. As shown, the servomotor 14 is operatively connected to the elevator surfaces 15 of the aircraft by way of direct shafting and suitable reduction gearing. The reference means is a conventional type of gyro vertical with a pick-off at its minor axis that provides a signal in accordance with the displacement of the craft from a reference position about its pitch or athwartship axis. The gyro vertical includes a rotor case 16 that supports a gyroscopic rotor (not shown) therein adapted to spin about a substantially vertical axis. Case 16 is universally mounted relatively to the craft by a gimbal ring 17 whose major axis trunnions are directed parallel to or coincident with the fore and aft axis of the craft as indicated by the term "Fore" and the arrow indicative of the direction of the forward movement of the craft. The ring 17 supports the rotor case 16 through means of a suitable minor axis connection situated perpendicularly to the major axis thereof, the minor axis being athwartship and corresponding or being parallel to the pitch axis of the craft. As shown, the reference means further includes the pick-off 11 whose wound stator is fixed to the gimbal ring 17 and whose wound rotor is fixed to one of the trunnions extending from the rotor case 16. Energy for the pick-off 11 is obtained from a suitable source of alternating current electrical energy 18 by way of leads to the wound rotor thereof. The illustrated reference means is mounted with freedom relative to the craft so that movement of the craft about its pitch axis, in this instance, from the position established by the reference means results in an electrical signal from pick-off 11 whose amplitude depends on the extent of the angular displacement and whose phase or polarity depends on the direction of the displacement. When the craft is at the attitude about its pitch axis that corresponds to the standard established by the reference means, the output of the signal pick-off 11 is null.

As shown in the drawing, the signal of pick-off 11 is fed to the displacement section 19 of the elevator servo amplifier 12 by way of leads 20, 21. The rate section 22 of the amplifier 12 is also supplied with the signal of the pick-off 11 by way of leads 20 and leads 24. The outputs of the respective sections 19, 22 are fed to the power section 25 of the amplifier 12 by way of suitable connecting leads as shown in the drawing. In addition to the displacement and rate signals supplied to section 25 from the respective sections 19, 22, a third source of control signal is supplied to section 25 from a repeatback pick-off 26 by way of leads 27. The wound rotor of the synchro or pick-off 26 is shown connected to the elevator 15 by suitable shafting so that the same moves with the elevator as the surface is moved by the servomotor from a trim or streamline position. The rotor of repeatback pick-off 26 is energized by the alternating current energy source 18. The wound stator of the synchro or repeatback pick-off 26 is fixed with respect to the craft and is suitably connected to leads 27. The signal of the pick-off 26 is fed back to the power section of the amplifier 12 in opposition to the input to the section 25 from the displacement section 19. The amplitude of the feedback or repeatback signal is dependent on the magnitude of the displacement of the control surface or elevator 15 from trim. The phase of the repeatback signal depends on the direction or sense of such displacement.

The output of the amplifier 12 from power section 25 feeds a motor-generator set of the Ward-Leonard type by way of leads 28 which connect as shown with the field circuit of a direct current generator 29. The armature circuit of the generator 29 energizes the armature of the servomotor 14 by way of leads 30. The field (not shown) of the servomotor 14 is energized from a suitable source of electrical energy. Generator 29 is driven by a constant speed motor 31 that is energized from a constant source of electrical energy. As shown, the armature circuit of the motor 31 may include a battery 32 and a relay 34 whose armature 35 normally engages contact 36 due to the influence of spring 37 to close the armature circuit of the motor 31. The means for monitoring the control system or automatic pilot may be provided in the present application by the armature circuit for motor 31 including relay 34 which operates to open the circuit and render the system ineffective when malfunction occurs as hereinafter more particularly described. The automatic pilot components described to this point are of a conventional nature being found in the hereinbefore noted Patent 2,487,793. For a more detail disclosure of the section parts generally designated at 19, 22 and 25 in the drawing as the elevator servo amplifier 12, reference is made to the patent to Halpert, Frische, Bird and Esval, No. 2,462,095, issued February 22, 1949, for Electrical Control Systems.

The box 38 in the drawing labeled craft controlling or maneuvering signal means shows three alternative usable sources of signal information for operating the servomotor 14 that effectively modify the normal reference provided by the control system or automatic pilot. One of these sources is a directional radio receiving means or instrument landing radio receiver 39 that is carried by the craft and is responsive to a suitable ground transmitter (not shown) which produces overlapping differently modulated field pattern lobes or other directionally characteristic radiation defining a particular desired flight path. The indicated receiver 39 provides an output signal in accordance with the magnitude of the displacement of the craft from the predetermined radio defined path. The polarity of the output signal from receiver 39 is dependent on the sense of the displacement of the craft from the radio path. Such radio guidance means is well known and is therefore not shown or described in greater detail.

The second of the controllers for the system is provided by an altimeter having a pick-off connected thereto. The altimeter and pick-off may be of the type disclosed in U. S. Patent No. 2,446,546, issued August 10, 1948, to A. W. Meston, in which one end of an atmospheric pressure responsive bellows 40 is fixed relative to the craft and the opposite end contains an actuator rod 41 adapted to position the armature element 42 of a pick-off 44. The stator of the pick-off 44 is fixed to the craft and includes an E-shaped core of magnetic material with a winding on its central leg that is connected to the alternating current source 18. The windings on the outer legs of the fixed core are connected in series opposition so that when the armature 42 is in its central position relative to the core, equal and opposite voltages are induced therein and the net output of the pick-off is zero. Displacement of the armature 42 relative to the core produces a proportional voltage output whose phase depends upon the direction of the displacement of the parts. With the altimeter included in the system, an output from pick-off 44 due to change in altitude of the craft causes operation of the servomotor 14 to effectively modify the reference provided by the signal pick-off 11 and return the craft to its original altitude.

The third controller of the system is shown in the box 38 as a suitable manually settable pick-off 45 of the double wound type such as the pick-off 11 of the gyro vertical 10. In this instance, the stator of the pick-off 45 is fixed in relation to the craft and the rotor is set by a manually adjustable knob 46. The rotor of the pick-off 45 is energized through a suitable connection to the alternating current source 18. With pick-off 45 connected to the automatic pilot or control system, the human pilot is able by changing the setting of knob 46 from a null position to maneuver the craft into a climb or dive attitude.

A two hole, three position, switch 47 is settable by the human pilot so that any one of the described maneuvering controllers may be included in the improved control system or automatic pilot. As shown, the switch 47 is set to include the manually settable pick-off 45 in the system.

The improved control system also includes a means providing a signal in accordance with the output of the servomotor 14. This means may be provided in either of the manners taught by the noted Patent No. 2,487,793. As herein shown, this measure is obtained by a parallel circuit connection constituted by leads 48 to the output leads 30 of the generator 29. The signal across the leads 48 is in accordance with the input signal operating the servomotor 14 from generator 29. As the output of the servomotor 14 is proportional to its controlling input signal, the signal obtained by the parallel circuit connection across leads 30 is in accordance with such output. An equivalent output may be obtained by a pick-off driven by the servomotor 14 as shown in Fig. 9 of the patent wherein the pick-off is indicated at 110 and the servomotor at 53.

The means for detecting malfunctions of the improved servomotor control system is shown in the drawing as malfunction detector 49 which comprises a band pass filter receiver for the signal of the servomotor output measuring means. This receiver includes a resistor 50, a choke 51 and a condenser 52 situated in series relation. One of the leads 48 is directly connected to the resistor 50 of the malfunction detector. The choke in the detector 49 is constituted by the winding of the relay 34 and is effective upon occurrence of malfunction in the system to break the circuit energizing the motor 31 and thusly disable or otherwise modify the operation of the system. The condenser 52 of the band pass filter receiver is of such value and character as to block the passage of the direct current signal from generator 29 by way of leads 30, 48 and any alternating current component therein with a frequency below a predetermined frequency such as, for example, five cycles per second as may be included in the output of the generator 29 in the normal functioning of the system with the craft operating in rough air. Any signals of a substantially higher frequency in the system than the indicated frequency are generally caused by and are herein attributed to a malfunction. The condenser 52 is constructed to pass such higher frequencies, the choke then operating to perform its monitoring function. The band pass filter receiver is consequently designed to block direct current and alternating current signals of a lower frequency than five cycles per second. As signals in the frequency band from five cycles per second up to the maximum frequency generated in the control system are passed by the receiver, it is herein designated as a band pass filter receiver. The receiver described provides a low cost accurate monitor for the entire control system or automatic pilot that functions without the need of an accelerometer device as provided on the noted patent or its equivalent for detecting the actual motion of the craft.

In accordance with the invention, the detector 49 is adapted to also compare the signals of the provided servomotor output means and the craft controlling or maneuvering signal means when the signal of receiver 39, altimeter pick-off 44, or manually settable pick-off 45 is included in the system. As shown, the switch 47 is connected to section 19 of amplifier 12 by way of leads 54, 55 so that the servomotor 14 is responsive to the respective craft controlling or maneuvering signal means included in box 38. With operation of the craft in a maneuver due to the inclusion of one of the craft controlling or maneuvering signal means on the system, the detector 49 would normally function to operate the monitor and render the system ineffective. In order that that malfunction detecting system remain effective during such periods, the detector 49 is fed a signal in opposed relation to the signal thereto from the servomotor output measuring means. This signal is obtained from the craft controlling or maneuvering signal means by way of switch 47, leads 54, leads 56, a suitable phase sensitive demodulator and amplifier 57, leads 58, and a coupling network 59. One of leads 48 provides a common connection between network 59 and one of the leads 30. As shown, lead 60 from network 59 connects with the condenser 52 of detector 49 by way of relay 61 through the contact 62 and armature 64. Spring 65 normally holds armature 64 against the contact 62 so that the circuit is closed. The arrangement and values of the electrical resistance and capacitance components of the network 59 are selected so as to obtain proper matching of the signals when no malfunction is involved even though such signal may include components of higher than a five cycle per second frequency due to the inclusion of the maneuvering signal in the system. The network 59 is designed to properly handle signals from the maneuvering signal means whose rate of change is below a predetermined value. When such value is exceeded, the monitor may operate to disable the system without the occurrence of malfunction. In order to prevent this condition, the system includes a means for measuring the rate of change of the signal of the craft controlling or maneuvering signal means. Such means is identified in the drawing by the rate network and rectifier 66. Rate network and rectifier 66 is energized by way of leads 67 connected across leads 58. The system further includes means responsive to the rate measuring means provided by network and rectifier 66 for disabling the malfunction detector 49 when the rate of change of the craft controlling signal reaches a predetermined limit. Such means is constituted by a sharp cutoff pentode 68, an amplifier 69 and the winding 70 of the relay 61. The arrangement is such that at a predetermined output from network and rectifier 66 as determined by a signal on the grid of pentode 68 connected to the output of the rectifier 66 by way of lead 71, the plate circuit of the pentode 68 conducts electrical energy to amplifier 69 which then supplies an output to winding 70 to operate the relay 61 to pull the armature 64 against a contact 72 which is connected to the detector 49 by way of lead 74, resistor 75 and lead 76. This opens the circuit containing the detector 49 so that the monitor is temporarily disabled. This disablement continues for the length of time that the rate of change of the maneuvering signal is higher than the permitted value. During this time any charge on the condenser of the filter receiver is permitted to discharge across the resistor 75. When the grid signal of the pentode 68 goes below the predetermined value, the pentode 68 immediately cuts off and the malfunction detector is automatically restored to effectiveness in the system after a short period of time in which transients due to the maneuvering signal have died out.

With a null maneuvering signal from the box 38, the detector 49 functions per se as a band pass filter receiver for the signal of the servomotor output measuring means of the system that operates with malfunction in any part of the system. The monitoring action responsive to the detector 49 renders the system ineffective by operation of relay 34 to open the energizing armature circuit of motor 31. With the maneuvering signal means included in the system and providing an operating signal for the servomotor 14, the detector 49 compares the signals of the servomotor output measuring means with the maneuvering signal as modified by network 59 to permit the comparison. The detector 49 remains effective to detect malfunctions as herein provided as long as the rate of change of the signal of the maneuvering signal means does not exceed a predetermined value. When the rate of change of the maneuvering signal means does exceed the predetermined rate, the relay 61 operates to disable the detector 49 for the duration of the condition. The detector 49 is automatically restored to effectiveness by the pentode 68 when this condition no longer exists.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. The combination in a servomotor control system for dirigible craft of the character normally functioning to maintain the craft at a predetermined reference attitude about an axis, of, a reversible servomotor operable to move the craft about the axis, craft controlling means providing an operating signal for the servomotor to modify effectively the normal reference provided by the system, means providing a signal in accordance with the output of the servomotor, means for detecting malfunction of the system comprising a band pass filter receiver for the signal of said output signal means, means for comparing the signals of said craft controlling means and output signal means in opposed relation, and a monitor for the system operated by said receiver.

2. The combination claimed in claim 1, in which said craft controlling means is a manually settable pick-off.

3. The combination claimed in claim 1, in which said craft controlling means is an altimeter having a pick-off connected thereto.

4. The combination claimed in claim 1, in which said craft controlling means is a directional radio receiving means providing an output in accordance with the displacement of the craft from a predetermined radio defined path.

5. The combination claimed in claim 1, including means for measuring the rate of change of the signal of said craft controlling means, and means responsive to said rate measuring means for disabling said malfunction detecting means when the rate of change of the craft controlling signal reaches a predetermined limit.

6. The combination in a servomotor control system for dirigible craft of the character normally functioning to maintain the craft at a predetermined reference attitude about an axis, craft controlling means providing an operating signal for the servomotor to modify effectively the normal reference provided by the system, means providing a signal in accordance with the output of the servomotor, means for detecting malfunctions of the system comprising a band pass filter receiver comparing the signals of said output signal means and craft controlling means in opposed relation, and a monitor for the system operated by said receiver.

7. The combination in a servomotor control system for dirigible craft of the character normally functioning to maintain the craft at a predetermined reference attitude about an axis, craft controlling means providing an operating signal for the servomotor to modify effectively the normal reference provided by the system, means providing a signal in accordance with the output of the servomotor, means for detecting malfunctions of the system including means for comparing the signals of said output signal means and craft controlling means in opposed relation, means for measuring the rate of change of the signal of said craft controlling means, and means responsive to said rate measuring means for disabling said malfunction detecting means when the rate of change of the craft controlling signal reaches a predetermined limit.

8. An automatic pilot for aircraft movable about an axis including a reversible servomotor operable to cause the aircraft to move about the axis, means providing a first operating signal for the servomotor in accordance with angular displacement of the aircraft from a reference position about the axis, aircraft controlling means providing a second operating signal for the servomotor to modify effectively the reference provided by said first signal means, means providing a signal in accordance with the output of the servomotor, a band pass filter receiver for the signal of said output signal means for detecting malfunctions of the pilot, means for comparing the signals of said aircraft controlling means and servomotor output signal means in opposed relation, and a monitor for the pilot operated by said receiver.

9. The combination claimed in claim 8, in which said aircraft controlling means is a manually settable pick-off.

10. The combination claimed in claim 8, in which said aircraft controlling means is an altimeter having a pick-off connected thereto.

11. The combination claimed in claim 8, in which said aircraft controlling means is a directional radio receiving means providing an output in accordance with the displacement of the aircraft from a predetermined radio defined path.

12. The combination claimed in claim 8, including means for measuring the rate of change of the signal of said aircraft controlling means, and means responsive to said rate measuring means for disabling said malfunction detecting receiver when the rate of change of the aircraft controlling signal reaches a predetermined limit.

13. An automatic pilot for aircraft movable about an axis including a reversible servomotor operable to cause the aircraft to move about the axis, means providing a first operating signal for the servomotor in accordance with angular displacement of the aircraft from a reference position about the axis, aircraft controlling means providing a second operating signal for the servomotor to modify effectively the reference provided by the first signal means, means providing a signal in accordance with the output of the servomotor, a band pass filter receiver comparing the signals of said servomotor output signal means and aircraft controlling signal means to detect malfunctions of the pilot, and a monitor for the pilot operated by said receiver.

14. An automatic pilot for aircraft movable about an axis including a reversible servomotor operable to cause the aircraft to move about the axis, means providing a first operating signal for the servomotor in accordance with angular displacement of the aircraft from a reference position about the axis, aircraft controlling means providing a second operating signal for the servomotor to modify effectively the reference provided by the first signal means, means providing a signal in accordance with the output of the servomotor, means for detecting malfunctions of the pilot including means for comparing the signals of said servomotor output signal means and aircraft controlling signal means in opposed relation, means for measuring the rate of change of the signal of said aircraft controlling means, and means responsive to said rate measuring means for disabling said malfunction detecting means when the rate of change of the aircraft controlling signal reaches a predetermined limit.

15. The combination in a servomotor control system for dirigible craft of the character normally functioning to maintain the craft at a predetermined reference attitude about an axis, of, a reversible servomotor operable to move the craft about the axis, means providing a signal in accordance with the output of the servomotor, means for detecting malfunction of the system comprising a band pass filter receiver for the signal of said output signal means, and means operated by said receiver for monitoring the system.

16. An automatic pilot for aircraft movable about an axis including a reversible servomotor operable to cause the aircraft to move about the axis, means providing an operating signal for the servomotor in accordance with the angular displacement of the aircraft from a reference position about the axis, means providing a signal in accordance with the output of the servomotor, a band pass filter receiver for the signal of said output signal means, and means operated by said receiver for monitoring the system.

References Cited in the file of this patent

UNITED STATES PATENTS

| | | |
|---|---|---|
| 2,487,793 | Esval et al. | Nov. 15, 1949 |
| 2,665,086 | Moog et al. | Jan. 5, 1954 |
| 2,673,314 | MacCallum | Mar. 23, 1954 |